US011983266B2

United States Patent
Ikram et al.

(10) Patent No.: US 11,983,266 B2
(45) Date of Patent: May 14, 2024

(54) SYSTEMS AND METHODS FOR EVENT-BASED APPLICATION CONTROL

(71) Applicant: BeyondTrust Corporation, Ridgeland, MS (US)

(72) Inventors: Omar Jawayd Ikram, Cheshire (GB); Simon Fradkin, Cheshire (GB)

(73) Assignee: BEYOND TRUST CORPORATION, Ridgeland, MS (US)

(*) Notice: Subject to any disclaimer, the term of this patent is extended or adjusted under 35 U.S.C. 154(b) by 0 days.

(21) Appl. No.: 18/155,330

(22) Filed: Jan. 17, 2023

(65) Prior Publication Data
US 2023/0237149 A1 Jul. 27, 2023

Related U.S. Application Data

(63) Continuation of application No. 16/901,679, filed on Jun. 15, 2020, now Pat. No. 11,556,634.
(Continued)

(51) Int. Cl.
*G06F 21/54* (2013.01)
*G06F 9/54* (2006.01)

(52) U.S. Cl.
CPC .............. *G06F 21/54* (2013.01); *G06F 9/542* (2013.01); *G06F 2221/033* (2013.01); *G06F 2221/2101* (2013.01)

(58) Field of Classification Search
CPC .......... G06F 21/51; G06F 21/52; G06F 21/54; G06F 21/554; G06F 21/56; G06F 21/566;
(Continued)

(56) References Cited

U.S. PATENT DOCUMENTS 6,463,474 B1 * 10/2002 Fuh ...................... H04L 63/0227
709/225
2015/0135253 A1 * 5/2015 Angel ................. H04L 63/0254
726/1
2019/0124118 A1 4/2019 Swafford et al.

FOREIGN PATENT DOCUMENTS

EP 2691908 A2 2/2014
WO 2012135192 A2 10/2012

OTHER PUBLICATIONS

Mooney, Santa Leaves The Kernel: A macOS Endpoint Security Introduction and Case Study, Apr. 2020.*
(Continued)

*Primary Examiner* — Minh Dinh
(74) *Attorney, Agent, or Firm* — Morris, Manning & Martin, LLP; Daniel E. Sineway, Esq.; Adam J. Thompson, Esq.

(57) ABSTRACT

Systems and methods are disclosed for event-based application control. A system extension is configured to leverage an endpoint security API for monitoring event activity within operating system kernel processes. The system extension registers with the endpoint security API particular event types for which the system extension would like to receive notifications. In response to receiving notifications regarding detected events corresponding to the registered event types, the system extension determines if the event, and its corresponding process, are safe and allowable to execute. In various embodiments, the system leverages whitelists, blacklists, and rules policies for making a safeness determination regarding the event notification. The system extension transmits this determination to the operating system via the endpoint security API.

20 Claims, 12 Drawing Sheets

Related U.S. Application Data

(60) Provisional application No. 62/860,888, filed on Jun. 13, 2019.

(58) Field of Classification Search
CPC ....... G06F 2221/033; G06F 2221/2101; G06F 9/542; H04L 63/10–108
See application file for complete search history.

(56) References Cited

OTHER PUBLICATIONS

Alexandr, Avoiding Kernel Development in macOS with System Extension and DriverKit, Apr. 2020.*
Microsoft Computer Dictionary, 2002, Fifth Edition, pp. 433.*
Knightsc: "An example of using the libEndpointSecurity.dylib in Catalina", Jun. 10, 2019 (Jun. 10, 2019), XP055760958, Retrieved from the Internet: URL:https://gist.github.com/mcastilho/1774c12bb8b35be5c03f6c2e268eae64/revisions [retrieved on Dec. 17, 2020]; 48 pages.
Combined Search and Examination Report issued by the Great Britain Intellectual Property Office on Feb. 9, 2021, in GB application No. GB2009089.0; (10 pages).
Kotyk A., "Avoiding Kernel Development in macOS with System Extensions and DriverKit," Apr. 2, 2020, 22 Pages.
"Microsoft Computer Dictionary," Microsoft Corporation, 2002, Fifth Edition, pp. 433, 3 Pages.
Mooney N., "Santa Leaves the Kernel: A MacOS Endpoint Security Introduction and Case Study," Duo Security, Apr. 21, 2020, 10 Pages.

* cited by examiner

← 603

| Confirm Operation | defendpoint |

Use of this Bundle is audited. Are you sure you wish to proceed?

Program Name    Calculator.app

Publisher       Software Signing

Program Path    /Applications/Calculator.app

[ No ]    [ Yes ]

| Authorization Required | defendpoint |

Before using this Bundle, you must first enter a response code.
Please contact IT Support quoting the code displayed below Program Name    Calculator.app Publisher         Software Signing Program Path     /Applications/Calculator.app

Enter Response Code

To get a Response Code contact IT Support and quote the number shown on screen 1187 1609

[ Cancel ]  [ Authorize ]

Request For Access  defendpoint

Use of this Bundle is subject to approval by IT Support. Please enter a reason below and click Submit.

Program Name    Calculator.app

Publisher        Software Signing

Program Path    /Applications/Calculator.app

Please provide a reason

[Cancel] [Submit]

FIG. 6F

SYSTEMS AND METHODS FOR EVENT-BASED APPLICATION CONTROL

CROSS-REFERENCE TO RELATED APPLICATIONS

This U.S. Non-Provisional Patent Applications is a continuation of U.S. Non-Provisional Patent application Ser. No. 16/901,679, filed on Jun. 15, 2020, and entitled "SYSTEMS AND METHODS FOR EVENT-BASED APPLICATION CONTROL", which claims the benefit of, and priority to, U.S. Provisional Patent Application No. 62/860,888, filed on Jun. 13, 2019, and entitled "SYSTEMS AND METHODS FOR OPTIMIZING COMPUTER OPERATIONS VIA TARGETED KAUTH PAUSING," the disclosures of which i-s are incorporated by reference as if the same were disclosed herein their entireties.

TECHNICAL FIELD

The present systems and methods relate to managing process and application security in computer operating systems, and more particularly to determining process and application safeness via plugins and operating system extensions.

BACKGROUND

Computer operating systems have generally provided developers with access to kernel space for various reasons, such as, for example, for allowing dynamic loading of code (e.g., plug-ins, KEXTS, etc.) into kernel space for monitoring activity within the kernel space. However, newer versions of operating systems, such as the MACOS® operating system, no longer allow such access to kernel space for some activities, as some kernel access mechanisms (e.g., KEXTS) were prone to introducing detrimental inefficiencies into the executed process (e.g., "frozen screens" in response to a hanging state of an executed process). Instead, these newer operating system versions provide limited access to activity from user space (e.g., via Apple's Endpoint Security API), without providing access to kernel-level control of the activities. Therefore, there exists a long-felt but unresolved need for systems and methods for controlling applications based on events identified within the kernel space, without directly accessing the kernel space.

BRIEF SUMMARY OF DISCLOSURE

Briefly described, and according to one embodiment, aspects of the present disclosure generally relate to systems and methods for managing process and application security in computer operating systems, and more particularly to determining process and application safeness via plugins and operating system extensions.

Primary embodiments of the present disclosure discuss systems and methods for allowing developers to extend the capabilities of computer operating systems (such as Apple's macOS) from userspace, rather than from the kernel. In one embodiment, the capabilities are extended via system extensions. As one of ordinary skill in the art will understand, system extensions allow software, like endpoint security solutions, to extend the functionality of an operating system without requiring kernel-level access. According to various aspects of the present disclosure, the systems and methods discussed herein leverage endpoint security APIs for monitoring system events, and subsequently allowing, denying, and terminating the system events. The systems and methods discussed herein can utilize the endpoint security APIs to act on the system events based on predefined policy rules.

As will be discussed in greater detail herein, the disclosed system includes at least a system extension in communication with an operating system via an endpoint security API, and a security service in communication with the system extension for enforcing security policies against system events detected via the endpoint security API. In various embodiments, the system extension may register with the operating system (via the endpoint security API) to receive event notifications when events or event types such as "open file" and "execute" events are called. In at least one embodiment, and in response to one of the registered event types being called, the operating system (via the endpoint security API) may transmit an event notification to the system extension.

In various embodiments, the system extension may store one or more event notifications in a queue (e.g., a queue, linked list, vector, or the similar appropriate storage container) or computer memory, for determining an appropriate action based on the one or more event notifications. In some embodiments, a large (an overbearing) amount of event notifications may be transmitted to the system extension. Accordingly, and in particular embodiments, the present systems and methods leverage blacklists and whitelists for optimally determining if a particular event type is known to be safe or unsafe to proceed with.

According to various aspects of the present disclosure, the blacklists and whitelist are predefined lists including event notification metadata, where if an event notification is found to include whitelisted metadata, the corresponding event is automatically determined to allow the action to occur (e.g., execute or open). Furthermore, if an event notification is found to include blacklisted metadata, the corresponding event may be automatically denied/blocked, or the event notification may be transmitted to the security service for evaluating the event notification against a rules policy, or the like. In certain embodiments, event notifications may be compared to the system blacklists and whitelists in response to being received at the system extension queue however, event notifications may be compared to the system blacklists and whitelists prior to ever being stored in the queue, for further optimizing the system throughput. Moreover, the system blacklists and whitelists may be dynamically updated in response to outcomes determined at the security service. For example, if the security service continually and consistently determines that an event notification including particular metadata is safe to execute, the system may therefore add the metadata from the event notification to the whitelist. Accordingly, the reverse scenario may also hold true for dynamically adding event metadata to the blacklist.

In one embodiment, the present disclosure discusses a method including: subscribing, via a system extension executed by at least one computing device, for at least one event type with an operating system; receiving, via the system extension, an event notification including metadata associated with an event, the event corresponding to one of the at least one event type; applying, via the system extension, a policy including a plurality of rules to the event notification; determining, via the system extension, whether to allow the event according to the plurality of rules; instructing, via the system extension, the operating system whether to allow the event based on the determination.

In various embodiments, the method further includes generating, via the system extension, a copy of the event notification; transmitting, via the system extension, the copy of the event notification to a security service. In a particular embodiment, the system extension is at least one of: a software application with a system extension application type or a software application with access to the endpoint security application programming interface (API). In one embodiment, subsequent to instructing the operating system to deny the event, generating a command to kill a process corresponding to the event.

According to various aspects of the present disclosure, applying the policy includes: sending, via the system extension, the event notification with the metadata to a security service; applying, via the security service, the policy to determine a result; and receiving, via the system extension, the result from the security service. In certain embodiments, the security service is a daemon and the system extension and the security service are configured to communicate via interprocess communication.

In various embodiments, the method further including: determining, via the system extension, that a predefined time threshold from receipt of the event notification has been exceeded; and instructing the operating system to deny the event based on the predefined time threshold being exceeded.

In a particular embodiment, the predefined time threshold is equal to an operating system timeout corresponding to the event notification minus a predefined offset. In one embodiment, the predefined offset is about 5%-10% of the operating system timeout.

In at least one embodiment, the method further includes receiving, via the system extension, a second event notification including second metadata associated with a second event; determining, via the system extension, that the second event corresponds to a whitelisted event according to the second metadata; and instructing, via the system extension, the operating system to allow the second event in response to the second event corresponding to the whitelisted event.

In various embodiments, the method includes receiving, via the system extension, a second event notification including second metadata associated with a second event; determining, via the system extension, that the second event corresponds to a blacklisted event according to the second metadata; and instructing, via the system extension, the operating system to deny the second event in response to the second event corresponding to the blacklisted event. Furthermore, in certain embodiments the at least one event type includes an open event and an execution event.

According to various aspects of the present disclosure, a system is described including: at least one computing device; a security service executable by the at least one computing device; and a system extension in communication with the security service and executable by the at least one computing device, the system extension being configured to: subscribe with an operating system executed by the at least one computing device for at least one event type; receive an event notification including metadata associated with an event, the event corresponding to one of the at least one event type; send the event notification to the security service; receive data indicating whether to allow the event; instruct the operating system whether to allow the event based on the data indicating whether to allow the event.

In one embodiment, the security service is configured to apply a policy including a plurality of rules to the event notification. In various embodiments, the system extension is further configured to: receive a second event notification including second metadata associated with a second event; send the second event notification to the security service; receive second data indicating to allow the second event; determine that a modification has occurred to an application associated with the second event notification subsequent to receiving the second event notification; and instruct the operating system to deny the event based on the modification.

In a particular embodiment, the system extension is further configured to: receive a second event notification including second metadata associated with a second event; determine that a passive mode applies to the second event notification based at least in part on the second metadata; and generate an audit log corresponding to the result of the second event notification.

In at least one embodiment, the present disclosure discusses a system including: at least one computing device; a security service executable by the at least one computing device; and a system extension in communication with the security service and executable by the at least one computing device, the system extension being configured to: subscribe with an operating system executed by the at least one computing device for a plurality of event types with the operating system; receive a plurality of event notifications from the operating system, wherein each of the plurality of event notifications includes respective metadata associated with a respective event, each respective event corresponding to one of the plurality of event types; process a first event notification from the plurality of event notifications by: sending the first event notification to the security service; receiving data indicating whether to allow the respective event associated with the first event notification; and instructing the operating system whether to allow the respective event associated with the first event notification based on the data indicating whether to allow the respective event.

In a particular embodiment, the system extension is further configured to: store each of the plurality of event notifications in a queue when received; and process the plurality of event notifications from the queue. In various embodiments, the system extension is further configured to: upon receiving each particular event notification of the plurality of event notification: determine whether a whitelist includes the particular event notification; determine whether a blacklist includes the particular event notification; and in response to neither the whitelist or the blacklist including the particular event notification, send the particular event notification to the security service.

In one embodiment, subscribing with the operating system includes registering with an endpoint security application programming interface (API) for notifications. In certain embodiments, the notifications registered with the endpoint security API include an ES_EVENT_TYPE_AUTH_OPEN event type and an ES_EVENT_TYPE_AUTH_EXEC event type.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments, and/or aspects of the disclosure and, together with the written description, serve to explain the principles of the disclosure. Whenever possible, the same reference numbers are used throughout the drawings to refer to the same or like elements of an embodiment, and wherein:

FIGS. 6A-6F are exemplary user interface elements according to various aspects of the present disclosure.

DETAILED DESCRIPTION

Figure 1A:
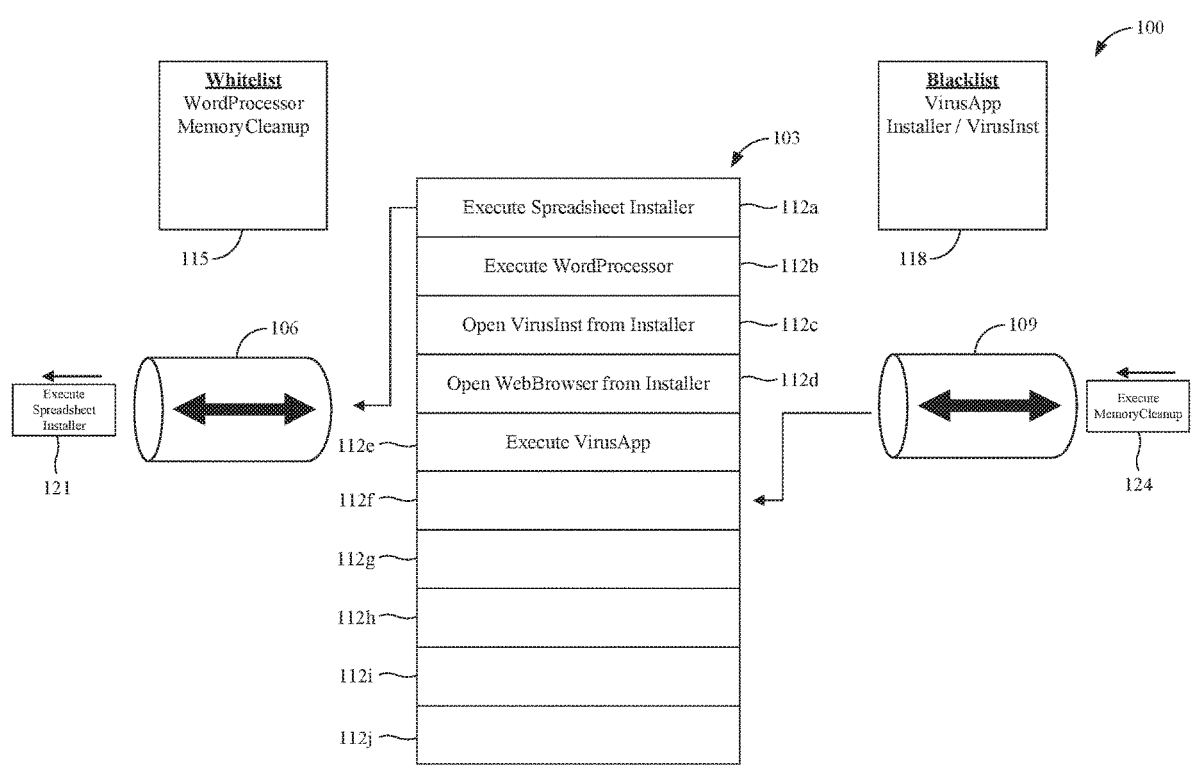
FIG. 1A illustrates an exemplary system operational diagram according to one aspect of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and according to one embodiment, aspects of the present disclosure relate generally to systems and methods for managing process and application security in computer operating systems, and more particularly to determining process and application safeness via plugins and operating system extensions. While the application uses the term "system extension" for various functionality, it can be appreciated that an application can perform the functionality described without being a system extension.

Primary embodiments of the present disclosure discuss systems and methods for allowing developers to extend the capabilities of computer operating systems (such as Apple's macOS) from userspace, rather than from the kernel. In one embodiment, this is done via system extensions. As one of ordinary skill in the art will understand, system extensions allow software, like endpoint security solutions, to extend the functionality of an operating system without requiring kernel-level access. According to various aspects of the present disclosure, the systems and methods discussed herein leverage endpoint security APIs for monitoring system events, and subsequently allowing, denying, and terminating the system events.

As will be discussed in greater detail herein, the disclosed system includes at least a system extension in communication with an operating system via an endpoint security API, and a security service in communication with the system extension for executing security policies against system events detected via the endpoint security API. In various embodiments, the system extension may register with the operating system (via the endpoint security API) to receive event notifications when events or event types such as "open file" and "execute" events are called. In at least one embodiment, and in response to one of the registered event types being called, the operating system (via the endpoint security API) may transmit an event notification to the system extension.

In various embodiments, the system extension may store one or more event notifications in a queue, or the similar appropriate computer memory, for determining an appropriate action based on the one or more event notifications. In some embodiments, a large (an overbearing) amount of event notifications may be transmitted to the system extension. Accordingly, and in particular embodiments, the present systems and methods leverage blacklists and whitelists for optimally determining if a particular event type is safe to process.

According to various aspects of the present disclosure, the blacklists and whitelist are predefined lists including event notification metadata, where if an event notification is found to include whitelisted metadata, the corresponding event is automatically determined to be executable. Furthermore, if an event notification is found to include blacklisted metadata, the corresponding event may be automatically denied/blocked, or the event notification may be transmitted to the security service for evaluating the event notification against a rules policy, or the like. In certain embodiments, event notifications may be compared to the system blacklists and whitelists in response to being received at the system extension queue; however, event notifications may be compared to the system blacklists and whitelists prior to ever being stored in the queue, for further optimizing the system throughput. Moreover, the system blacklists and whitelists may be dynamically updated in response to outcomes determined at the security service. For example, if the security service continually and consistently determines that an event notification including particular metadata is safe to execute, the system may therefore add the metadata from the event notification to the whitelist. Accordingly, the reverse scenario may also hold true for dynamically adding event metadata to the blacklist.

Figure 1B:
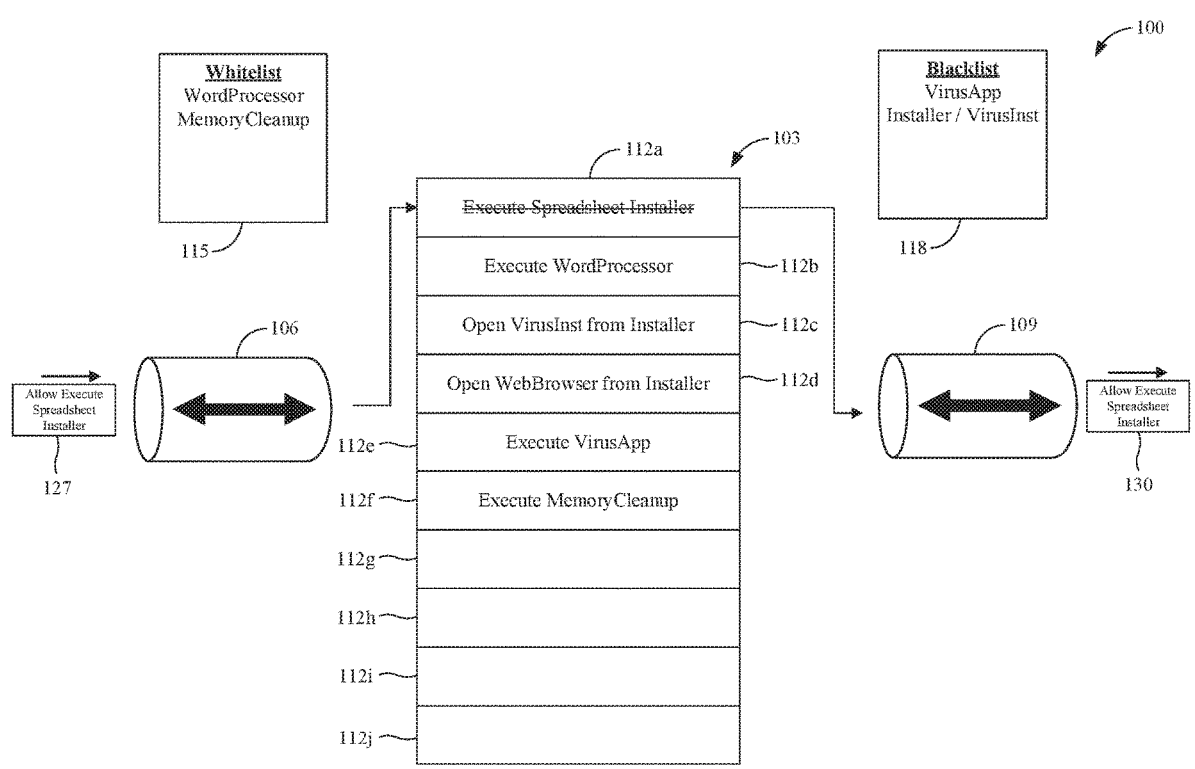
FIG. 1B illustrates an exemplary system operational diagram according to one aspect of the present disclosure.

Referring now to FIGS. 1A-1B, diagrams illustrating embodiments of an exemplary system extension 100 are shown, according to various aspects of the present disclosure. More particularly, FIG. 1A illustrates various components and execution steps at the system extension 100, in various embodiments. In some embodiments, the system extension can correspond to an Apple System Extension. In other embodiments, the system extension can correspond to an application running as root that has Endpoint Security enabled. In some embodiments, the com.apple.developer.endpoint-security.client entitlement may need to be enabled for the system extension. In one embodiment, the system extension 100 includes a queue 103 (e.g., a table of computer memory, or the like), including a plurality of event notifications read from an application or process running under an operating system. Furthermore, the system extension 100 includes a communication link 106 to a security service (not shown), and also a communication link 109 to an operating system (not shown). In particular embodiments, the communication links 106 and 109 may communicate via inter-process communication ("IPC"). In some embodiments, the communication link 109 corresponds to a publish/subscribe interface of the operating system, which can be provided by the endpoint security API. As an example, the system extension 100 can register with the endpoint security API for various events, which can be provided via a callback function, a predefined interface, IPC, shared memory, or some other mechanism. As will be understood by one of ordinary skill in the art, IPC is a low-level communication mechanism by which processes communicate with each other for coordinating or synchronizing their executions and use of shared data and objects.

According to various aspects of the present disclosure, an operating system (not shown) is running on in the kernel space of a particular electronic computing device, and the system extension 100 may register to be alerted of certain events executing within the operating system via software solutions such as Apple's Endpoint Security API, or the like.

In at least one embodiment, the system extension 100 may register for, or subscribe to, one or more events or event types called within the operating system. For example, the system extension 100 may register with the operating system one or more events such that, when the operating system detects the events being called by an application or process, the operating system transmits (e.g., via Apple's Endpoint Security) an event notification to the system extension 100. In the present embodiment, the queue 103 includes a plurality of stored event notifications 112a-112j, where the event notifications 112a-112j correspond to events or event types detected by the operating system and transmitted to the queue 103 over the communication link 109. In the present embodiment, these event notifications 112a-112j were transmitted to the queue 103 in response to the operating system detecting actions calling for these events by a process or application. As will be discussed in further detail herein, the event notifications stored in the queue 103 may be subsequently processed for determining if the events corresponding to the event notifications are safe to execute.

Continuing with FIG. 1A, the system extension 100 may leverage whitelists and blacklists for determining if a particular event should be allowed to execute. In the present embodiment, the exemplary system extension 100 includes a whitelist 115 and a blacklist 118. As shown in the present embodiment, the whitelist 115 includes event metadata such as "WordProcessor" and "MemoryCleanup." Accordingly, if the operating system transmits an event notification to the queue 103 that includes this whitelisted metadata, the system extension 100 may instruct the operating system to automatically allow and execute the event without performing any additional safeness processing. Furthermore, the blacklist 118 includes event metadata such as "VirusApp" and "Installer" with "VirusInst" as metadata. Accordingly, if the operating system transmits an event notification to the queue 103 that includes this blacklisted metadata, the system extension 100 may instead determine that additional processing is to be performed on the event notification to determine if it is safe to execute, or the system extension may determine another appropriate action. In certain embodiments, the whitelisting and blacklisting steps may occur in response to event notifications being populated into the queue 103; however, these steps may also occur prior to the event notifications being populated into the queue 103 (for example, automatically allowing certain whitelisted events to execute, or automatically denying other blacklisted events, such that the events are never stored in the queue).

In the present embodiment, the first event notification in the queue 103 is the event notification 112a, "Execute Spreadsheet Installer." According to various aspects of the present disclosure, the exemplary system extension 100 determines that the event notification 112a is not included in either the whitelist or blacklist, and processes the message. In various embodiments, shown at the system callout reference 121, the system extension 100 processes the message by transmitting the event notification 112a via the communication link 106, or a copy of the event notification 112a, to the security service (not shown) for determining if the event notification 112a is indeed safe to execute.

In particular embodiments, event notifications may be added to the queue 103 as they are detected by the operating system. In the present embodiment, this is shown at the system callout reference 124, where an "Execute Memory-Cleanup" event notification is being transmitted over the communication link 109 from the operating system to the system extension 100. As is shown in FIG. 1B, this incoming event notification 124 populates the next memory location in the queue 103, the memory location 112E According to various aspects of the present disclosure, the event notifications store in the queue 103 may be evaluated/processed in the order in which they are received (e.g., first in, first out), or the event notifications may be evaluated in parallel, based on priority, based on override instructions, etc.

Turning now to FIG. 1B, in one embodiment, the memory location 112f is shown populated with the "Execute MemoryCleanup" event notification from the callout reference 124 from FIG. 1A. In some embodiments, the event notifications in the queue may be processed in any order, for example, sequentially, in parallel, based on priority, executing time, etc.

The embodiment shown in FIG. 1B furthermore illustrates the security service returning a result, at reference callout 127, corresponding to the "Execute Spreadsheet Installer" event notification, as shown in FIG. 1A at the callout reference 121. As indicated at the reference callout 127, the security service (not shown) indicated the "Execute Spreadsheet Installer" as safe and allowable to execute. Accordingly, the system extension 100 may remove the "Execute Spreadsheet Installer" event notification 112a from the queue 103, and furthermore return instructions to the operating system to allow the "Execute Spreadsheet Installer" event to execute (shown at reference callout 130).

According to various aspects of the present disclosure, the steps illustrated in FIGS. 1A-1B may repeat for each of the event notifications included in the queue 103. For example, system extension 100 will allow for the event notification 112b, "Execute WordProcessor," to execute, as the whitelist 115 includes the metadata "WordProcessor" as an allowable event metadata. Furthermore, in various embodiments, the system extension 100 may either deny/block the event notification 112c, "Open VirusInst from Installer" from executing rather than transmitting the event notification to the security service for further evaluation, as the event notification Installer with "VirusInst" as metadata is included in the blacklist 118. In further embodiments, in a particular embodiment, the "Open WebBrowser from Installer" event notification 11d, and the "Execute VirusApp" event notification 112e will also be denied, or further evaluated at the security service, as both event notifications include blacklisted metadata. In at least one embodiment, the system extension 100 will allow for the "Execute MemoryCleanup" event notification 112f to execute, as the event notification 112f metadata "MemeoryCleanup" is included in the whitelist 115. According to various aspects of the present disclosure, leveraging the whitelist 115 and blacklist 118 optimize system operations by reducing the number of event notifications sent to the security service. As will be discussed in greater detail herein, the operating system may establish a predefined time limit for responding to event notifications. In various embodiments, the system components communicate via inter-process communication, and thus transmitting each event notification from the system extension 100 to the security service would require more time than if a decision regarding the event notification could be determined immediately. Therefore, in particular embodiments, the whitelist 115 and blacklist 118 allow for the system extension 100 to optimally reduce which event notifications are transmitted to the security service, and also prevent the operating system from timing out with respect to certain event notifications.

Figure 2:
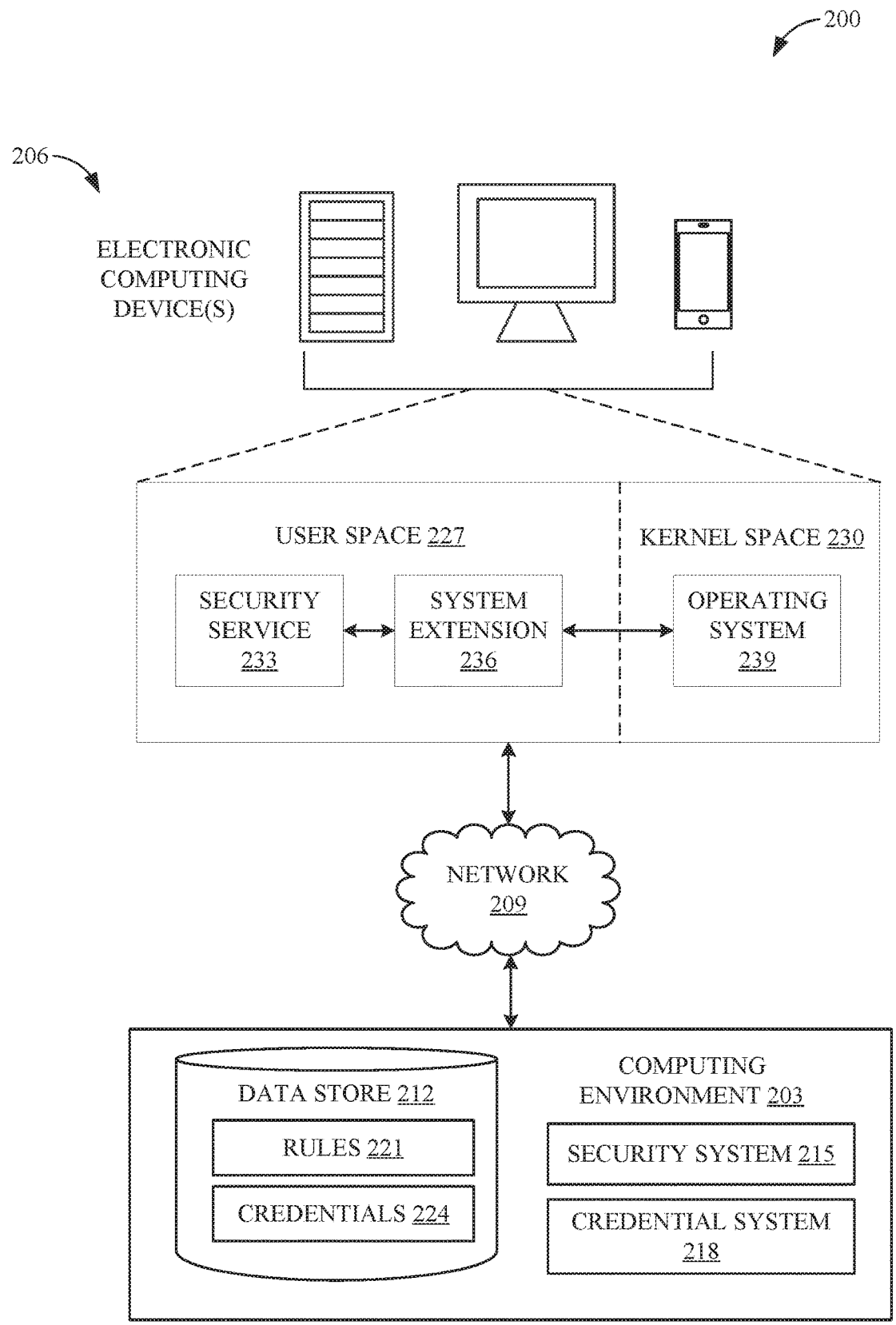
FIG. 2 is a diagram of an exemplary system architecture according to one aspect of the present disclosure.

Turning now to FIG. 2, a diagram illustrating an exemplary system architecture 200 is shown according to one aspect of the present disclosure. According to various aspects of the present disclosure, the exemplary system architecture 200 includes a computing environment 203 and one or more electronic computing devices 206 operatively connected over a network 209. In various embodiments, the network 209 may be a wired or wireless network (e.g., ethernet, LAN, WLAN, etc.). In one embodiment, applications and processes running at the one or more computing devices 206 may be monitored for security purposes by security services and system extensions managed and/or provided by the computing environment 203. For example, the computing environment 203 may be a server or the like which provides security services to the one or more electronic computing devices.

In at least one embodiment, the computing environment 203 includes a data store 212, which may store rules 221 and credentials 224 for providing security/authentication policies, and generally for determining if a particular application and/or events from a process are safe and authorized to execute. In certain embodiments, the computing environment 203 may also include a security system 215 for determining if a particular application is authorized to be executed, and a credential system 218 for determining if, for example, a particular user has appropriate credentials for accessing certain computing resources. The credential system 218 can validate the credentials as part of the approval to perform an event, such as installing an application. In some embodiments, the security service 233 can send a request to the security system 215 to analyze the event notification and apply rules 221 to the event notification. The security system 233 can send a result back to the security service 233, which can be sent to the system extension.

The rules 221 can include one or more policy files associated with various computing devices and user accounts. In some embodiments, the security system 215 can generate one or more policy files based on a combination of the user account and the computing device. The security system can periodically receive updates to the rules 221, such as, for example, from administrators. When the rules 221 are changed, the security system 215 can generate updated policy files. The security system 215 can transmit the updated policy files to the security service 233, and the security service 233 can store the policy files/rules locally for use in processing event notifications. In some embodiments, the security service 233 can verify that the policies stored locally correspond to a current version periodically, upon an event notification, or upon another event.

The security service 233 can manage and control a local secured storage on the computing device. The secured storage can be encrypted based on encryption keys provided by the security system 215. The policies/rules can be stored in the secured storage to prevent viewing or modifying by unauthorized parties. The security service 233 can utilize the secure storage to access the policies/rules to apply when an event notification is received.

In various embodiments, the one or more electronic computing devices 206 may include desktop or laptop computers, mobile computing devices such as smartphones and tablets, servers, or generally any computing device that runs an operating system. As will be understood by one of ordinary skill in the art of computing, computer memory is typically segregated such that certain data (e.g., applications, programs, files, etc.) may be stored in one memory location that is accessible to a user of the computer, while other data is stored in a separate, protected location away from the data accessible to the user. One example of this separation of computing resources is the segregation of user space and kernel space. Generally, kernel space is the location in computer memory reserved for execution of the operating system, and the userspace is the memory reserved for running other applications and programs. Furthermore, while processes running in the user space have limited access to memory only in user space, the kernel has access to all memory.

Accordingly, the present embodiment illustrates one or more electronic computing devices 206 which each include userspace 227 and kernel space 230. In particular embodiments, the userspace 227 includes a security service 233 and a system extension 236. The security service 233 and the system extension 236 may be executed with elevated system permissions, such as root or administrative. In one embodiment, the security service 233 and the system extension 236 may be executed with the highest possible permission level available while running in userspace. In various embodiments, the kernel space 230 includes at least an operating system 239. The operating system 239 can include an endpoint security component that provides an endpoint security application programming interface (API). According to one embodiment, the system extension 236 is a plug-in, or the like, which integrates with an endpoint security component of the operating system, and provides a user/developer with notifications to evaluate and take an action when an event occurs (for example, to allow, block, or terminate processes) from the userspace 227. In at least one embodiment, the system extension 236 may be configured to subscribe with the operating system 239 to receive notifications relating to certain event types being called at the operating system. As an example, on loading and initializing of the system extension 236, the system extension 236 may subscribe to one or more events, such as an open event and/or an execute event, among other events.

In response to the operating system 239 detecting these events or event types, the operating system 239 may subsequently transmit a notification corresponding to the detected event to the system extension 236. As an example, the system extension 236 may subscribe the operating system 239. The operating system 239 may include an object or libraries for developers that may be implemented, such as via an observer pattern, or the like. In one embodiment, system extension 236 may implement the interface and register to observe the events published by the operating system 239.

Moreover, in one embodiment, the system extension 236 is operatively connected to the security service 233. In various embodiments, the security service 233 is a daemon, or the like, for executing process safety and security rule policies against the detected event notifications.

Figure 3:
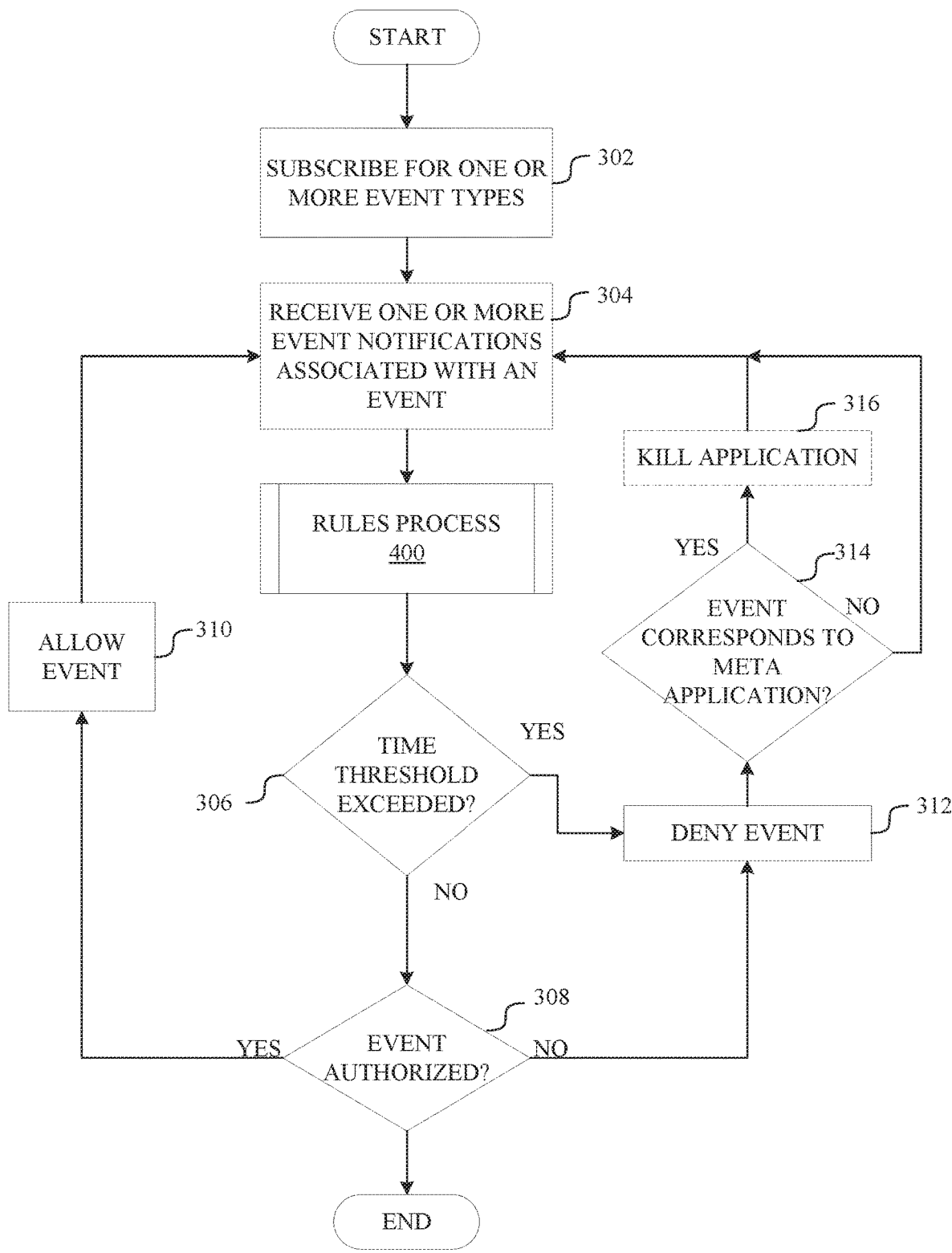
FIG. 3 is a flowchart of an exemplary event-based system process according to one aspect of the present disclosure.

Turning now to FIG. 3, an exemplary event-based system process 300 is shown, according to one aspect of the present disclosure. According to various aspects of the present disclosure, the system subscribes to an operating system for one or more events, and in response to the one or more events being detected, the system determines if the one or more events are safe to execute. In a particular embodiment, the exemplary process 300 begins at step 302, where the system subscribes to one or more event types. In one embodiment, the system may subscribe with the operating system to receive event notifications relating to the general event types "Execute," "Open," and any other appropriate event type. In particular embodiments, the system may subscribe with the operating system to receive event notifications relating to the "ES_EVENT_TYPE_AU- TH_EXEC" events, "ES_EVENT_TYPE_AUTH_OPEN" events, as well as other endpoint security event types. In one embodiment, the events can be passed together as an array to an es_subscribe function. According to various aspects of the present disclosure, the events for which the system extension is interested in are provided during initialization to the Endpoint Security API for monitoring, and the endpoint security service monitors in kernel space for their corresponding event calls. The endpoint security service may utilize the Endpoint Security API to alert the system extension of such event calls (discussed in greater detail below).

In one embodiment, at step 304, the system receives one or more event notifications from the operating system. In various embodiments, these event notifications correspond to the particular event types which the system extension subscribed to, and in response to the operating system detecting, identifying, or determining these events have occurred, the operating system transmits event notifications to the system extension. The endpoint security service or operating system can pause the event from occurring until a decision is made from all parties that have subscribed for the particular event notification. In some embodiments, when the event occurs, the operating system pauses the event before the open or execute can occur. The operating system can pause the event until receiving a response from the system extension.

In some embodiments, the system extension can determine whether the action corresponds to a monitored application. As an example, the system extension can determine whether various criteria for a monitored application are met. The criteria may include one or more of: whether the application is not another security application, whether the event notification corresponds to a privileged process, whether the application path in the event notification corresponds to a monitored location, among other criteria. In some embodiments, if the event notification does not correspond to a monitored application, the system extension may allow the event without sending to the security service. In some embodiments, if the event notification does correspond to a monitored application, the process proceeds to the rules process 400. In other embodiments, the security service rather than the system extension can perform the determination as to whether the application is monitored before applying a policy to the event notification.

In response to receiving one or more event notifications at step 304, the process 300 proceeds to the rules process 400, which is described in greater detail below in association with FIG. 4. According to various aspects of the present embodiment, the rules process 400 is a process by which the system determines if the event is authorized to occur or not. In various embodiments, the system makes this determination via techniques such as whitelisting, blacklisting, and evaluating the event notifications via a policy engine.

Proceeding now to step 306, the system checks if the predefined time threshold for responding to the event notification has been exceeded. The system can monitor the timeout thresholds for one or more messages in parallel while processing the message. As will also be discussed in the description of FIG. 4 below, the operating system may include a time limit for when event notifications may be responded to. The time limit may prevent the system extension from indefinitely pausing the execution of a program or opening of a program, which may negatively impact the user experience. Further, the operating system may select a time during the execution or opening of the program that is safe to pause.

It at least one embodiment, the present system includes a predefined time threshold that is the substantially the same or about 5-10 percent less than the operating system time limit, for allowing the system to respond to return a notification response to the operating system without exceeding the time limit. For example, if the operating system includes a 60 second time limit, the system may establish the predefined time threshold to be 55 seconds (e.g., about an 8 percent offset). The system may define the predefined time threshold based on the timeout of the operating system. As an example, the system can be configured with a 5-second offset or 8 percent offset. In this example, the system may determine the timeout for the operating system and set the predefined time threshold accordingly (e.g., if the timeout of the operating system is 60 seconds, the system (e.g., the system extension, the security service, the security system, or other components) can set the predefined time threshold to 55 seconds based on the configured offset).

In some embodiments, the system extension can determine that a timeout threshold has been exceeded and generate a notification or signal to the security service of the timeout. Based on the signal, the security service can close any open dialog messages associated with the event notification, clean up memory usage, and inform the user that the deadline has been reached.

If, at step 306, the system determines that the predefined time threshold was not exceeded, the process may proceed to step 308. In various embodiments, at step 308, the system determines if the process is safe or authorized to execute. According to various aspects of the present disclosure, this determination is typically returned as a result of the rules process 400, where the system evaluates the one or more received event notifications against rule policies.

In some embodiments, the system extension can monitor the particular application identified by the event notification while the security service is determining whether or not to permit the event. If the particular application is modified or overwritten after the event is generated, the system extension can deny the event regardless of the result returned from the security service. The system extension can monitor for this event by registering for a notification for write events (e.g., ES_EVENT_TYPE_NOTIFY_WRITE). When write events occur during the processing of an open or execute event type, the system extension can determine whether metadata associated with the write event corresponds to an application being evaluated for open or execute. If not, the system extension can ignore the message. Otherwise, the system extension can deny the open or execute event. Through the write event, the system extension can prevent tampering with an application while evaluating whether or not to open or execute the application. Accordingly, determining the safeness or authority for a process will be described in greater detail in association with the discussion of FIG. 4.

In various embodiments, if at step 308 the system determines that the event is indeed authorized to execute or open, the process 300 may proceed to step 310. In particular embodiments, at step 310 the system allows for the event to continue (e.g., execute, open, or take some other action). In certain embodiments, allowing for the event to execute may include returning a response to the operating system, where the response includes an authorization of the event (e.g., file open event, execute event, etc.). Furthermore, in response to allowing the event at step 310, the exemplary process 300 may return to the step 304 for receiving one or more additional notifications associated with an event. In some embodiments, the system extension can receive event notifications in parallel to processing event notifications. As an example, the system extension may include a first thread or process to receive event notifications, a second thread to process notifications, and a third thread to receive communications from the security service.

In one embodiment, if at step 306 the predefined time threshold is exceeded, or if at step 308 the process is determined to be unsafe or unauthorized, the process 300 proceeds to step 312. In a particular embodiment, at step 312, the system denies the event corresponding to the received event notification. In a particular embodiment, denying the event at step 312 includes returning a response to the operating system, where the response includes instructions to reject the event.

At step 314, the system determines if the event corresponds to a meta application (e.g., Packages). In various embodiments, when an application is installed, another application may be executed to perform the installation. As an example, when a first application that is in the form of a package is installed, a package installer may open the package for the first application and perform the installation. The same execute action is called for the package installer regardless of which package is being installed. However, once the package installer is executed, it opens the target file (referred to herein as a meta application) to be installed, which generates an open event. The open event includes the metadata describing the application to be installed. If the system extension were to deny the execute action for the package installer, no packages could be installed. Moreover, the execute event notification may only include details about the installer application rather than the end target to be installed. As such, the system extension and security service may allow the initial application to execute only to terminate the open event that follows from the initial application. The open event may be terminated based on an analysis by the policy engine of the metadata associated with the open event. As an example, the policy engine may determine which meta application is being opened and apply one or more rules to the meta application to determine whether the meta application is safe or authorized. Thus, at step 314, if the system determines that the event corresponds to a meta application, the process 300 proceeds to step 316.

At step 316, the system extension can kill the application. When the event corresponds to an open event, denying the event will prevent the program from being opened but the initial application is still running. As an example, a package installer may be executed to install VirusApp. The initial execute event is for the package installer, which may be allowed to execute. However, a follow up open event from the package installer may specify that VirusApp is to be installed, and the system may deny this open event. The opening of VirusApp may be prevented, but the package installer is still running. As such, the system can terminate the package installer that executed to install the VirusApp. In one example, the system extension can determine a process identifier for the first application (e.g., the package installer). The system extension can generate a kill command to terminate the process (e.g., "kill(PID, SIGKILL)" where PID is the process ID of the process opening the meta application). The system extension may have root privileges to be authorized to perform the kill/termination command. As such, when the system denies an open event, the system may also follow up and terminate the corresponding application that attempted the open event as well. The step 316 may correspond to an optional step that is only performed when an event corresponds to a meta application (e.g., an open event).

Furthermore, at step 314, if the event does not correspond to a meta application (and also in response to killing an application at step 316), the exemplary process 300 may return to step 304 for receiving one or more additional notifications associated with an event.

Figure 4:
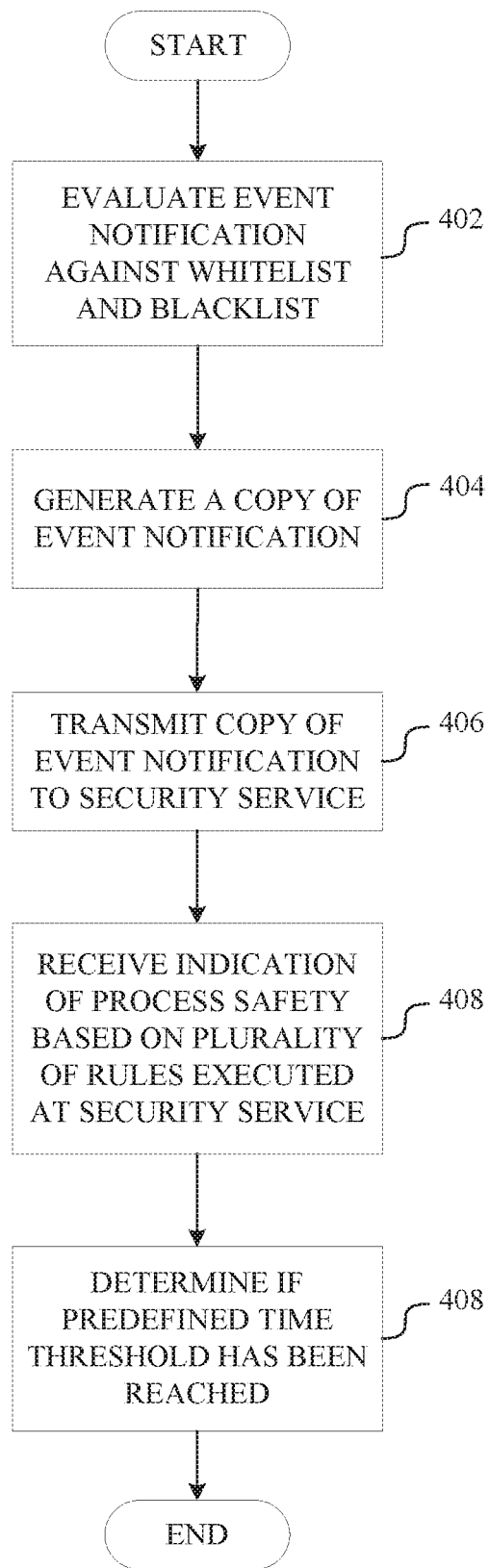
FIG. 4 is a flowchart of an exemplary rules process according to one aspect of the present disclosure.

Proceeding now to FIG. 4, a flowchart illustrating an exemplary rules process 400 is shown, according to one aspect of the present disclosure. In various embodiments, the rules process 400 is a process by which the one or more event notifications, received at step 302 of the process 300 described in association with FIG. 3, are evaluated for determining if the events, or the processes associated with the events, are safe to execute.

In one embodiment, the process 400 begins at step 402, where the system extension evaluates the event notification against a whitelist and a blacklist. In particular embodiments, the whitelist and blacklist are predefined lists including event notification metadata, where if an event notification is found to include whitelisted metadata, the corresponding event is automatically determined to be safe/allowable for execution. Furthermore, if an event notification is found to include blacklisted metadata, the corresponding event may be automatically denied/blocked.

The whitelist and blacklist may be utilized by the system extension to solve a technical problem related to resource usage. The operating system can generate a large volume of execute and open commands during normal operation. If every event notification received was fully processed by the rules engine, system performance and user experience would suffer. As such, the system can provide a technical solution to minimize the number of event notifications processed by the rules engine without reducing the security of the system overall. In some embodiments, the system can identify specific event notifications (e.g., the most frequent event notifications), apply the policy engine to those event notifications, and generate a whitelist and blacklist to prevent repetitive processing of authorized or unauthorized event notifications that may be safe/unsafe. In some embodiments, the system can determine that one or more policy files have changed. In response to the change, the system can regenerate the whitelist and/or blacklist, such as, for example, by determining if the whitelisted or blacklisted events are still authorized or unauthorized.

In some embodiments, the policy rules may include a variety of factors to be considered when deciding whether to allow or deny an event from occurring. Those factors can include details about the application, such as the name of the application, the version of the application, a hash or signature of the application. The factors can also include details of the system, such as user account, device identifier, whether the security service verifies one or more assertions on the device, a GPS location of the device, a current time of the device, among other factors. The system can determine command line arguments associated with the event as well as a process identifier (PID), a parent process identifier (PPID), a path of the application, a user identifier associated with the event, and a group identifier associated with the event. The system can determine a hash of the code directory (cdhash) for the application. The system can match the command line arguments against the policy rules. As an example, the system can obtain the command line arguments by the security service via a sysctl system call. With the previous Kauth "execute" action command line arguments may have been unavailable during a call to sysctl. However, the system extension can access the command line arguments with sysctl at the time the event notification is received. The system extension can access the command line arguments based on a pointer included an Endpoint Security message for the "ES_EVENT_TYPE_AUTH_EXEC" pointing to a struct that contains the command line arguments.

At step 404, the system extension may generate a copy of the event notification, according to one aspect of the present disclosure. In various embodiments, the system may generate a copy of the event notification to allow for the one or more event notifications to be processed out of order. Furthermore, generating a copy of the event notification/message allows for the system to extract information for processing the event notification. In some embodiments, the endpoint security API can be used to extract information about the event if the message is not copied. By generating a copy, the system can process events out of order instead of serially to avoid delaying processing of events while the security application generates a decision about authorization/safety of a particular application. In particular embodiments, the system leverages the endpoint security API for generating the event notification copy.

In various embodiments, the process 400 proceeds to step 406, where the system transmits a copy of the event notification to the security service. According to various aspects of the present disclosure, the security service may evaluate the event notification against a series of policy rules, and make a rule-based decision to determine if the process is safe to execute.

At step 408, in one embodiment, the system extension receives an indication of whether the event is authorized based on the policy engine executed at the security service.

Proceeding to step 410, the system extension determines if the predefined time threshold has been reached or exceeded without having received a determination as to whether to authorize or deny the event. According to various aspects of the present disclosure, the system may perform a default action if no determination has been made. As an example, the default action may be to deny the event corresponding to the event notification/message if the time threshold has been exceeded. In one embodiment, the system may be configured to allow the event if no determination is made even though such a policy may cause security concerns.

In particular embodiments, the system may complete the analysis to determine whether the event should be authorized and store the result if the time threshold has been exceeded for a respective event notification. The stored result can be applied if the event is attempted again within a predefined time limit. As an example, the security service may apply a policy to the event to determine that a user must enter credentials to execute a particular application. The security service may prompt the user for the credentials. If the credentials are not entered and authenticated within the time window, the system extension may deny the execution of the particular application. However, if the user credentials are authenticated after denial, the result of the policy engine decision may be stored such that a subsequent attempt to execute the particular application within a predefined time window (e.g., 5 minutes), may automatically return the stored result without performing the credential authentication again.

In one embodiment, event notifications raised by the operating system (via an endpoint security API), include a time threshold of about 60 seconds. Accordingly, in various embodiments, the system may include a separate predefined time threshold that is less than 60 seconds (e.g., about 55 seconds), for ensuring event notifications are responded to prior to exceeding the 60 second time limit.

Figure 5:
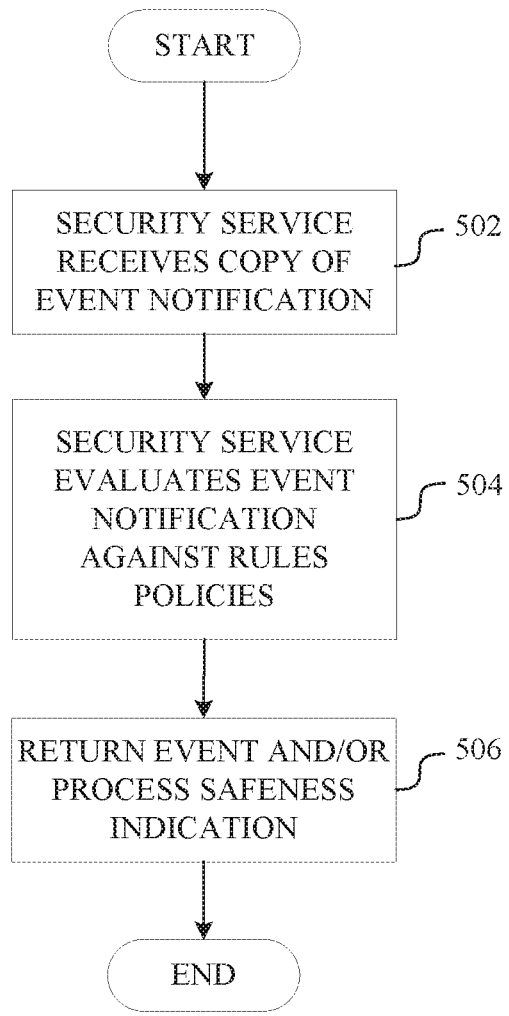
FIG. 5 is a flowchart of an exemplary security service process according to one aspect of the present disclosure.
Figure 6B:
Figure 6C:
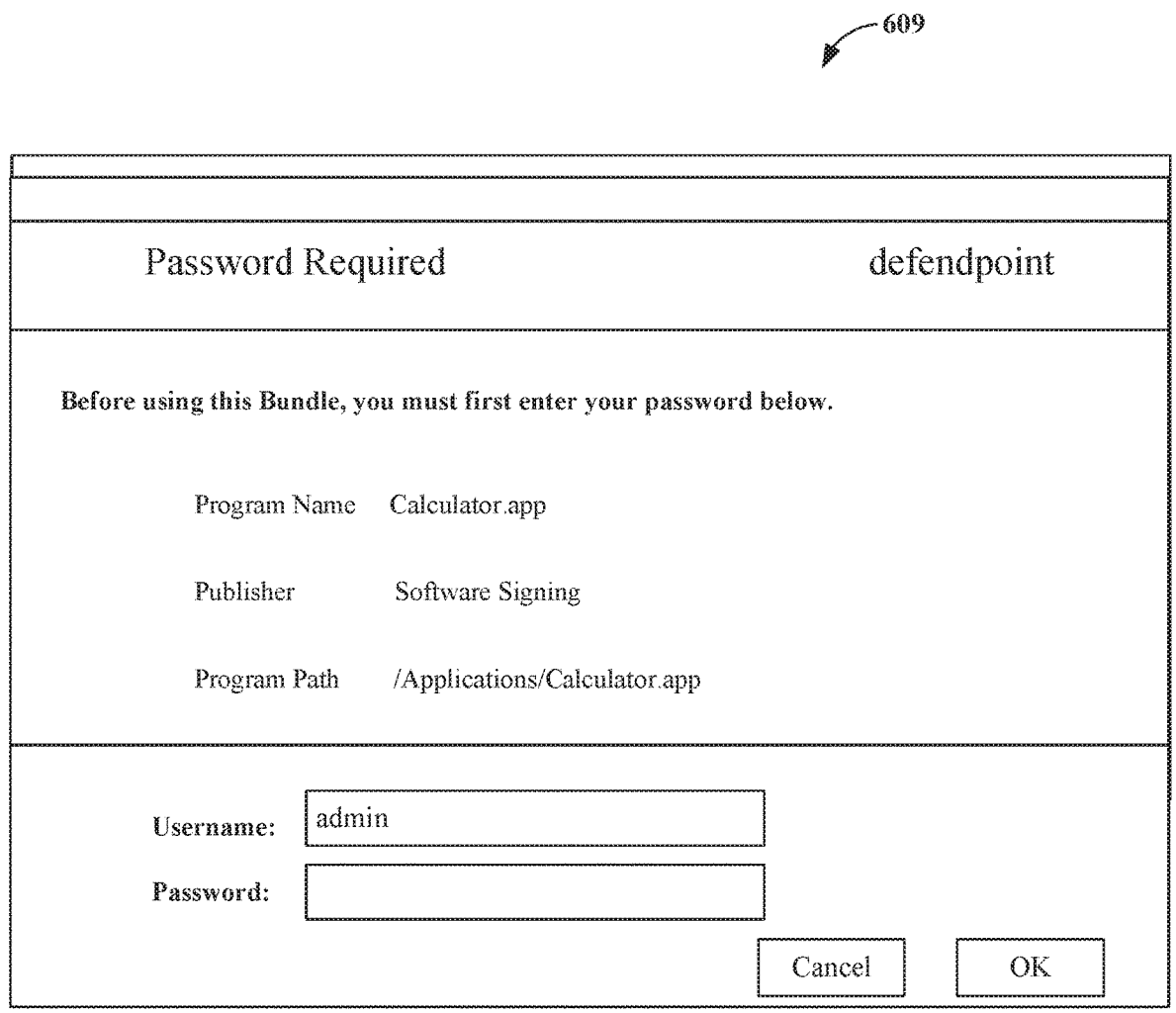
Figure 6E:
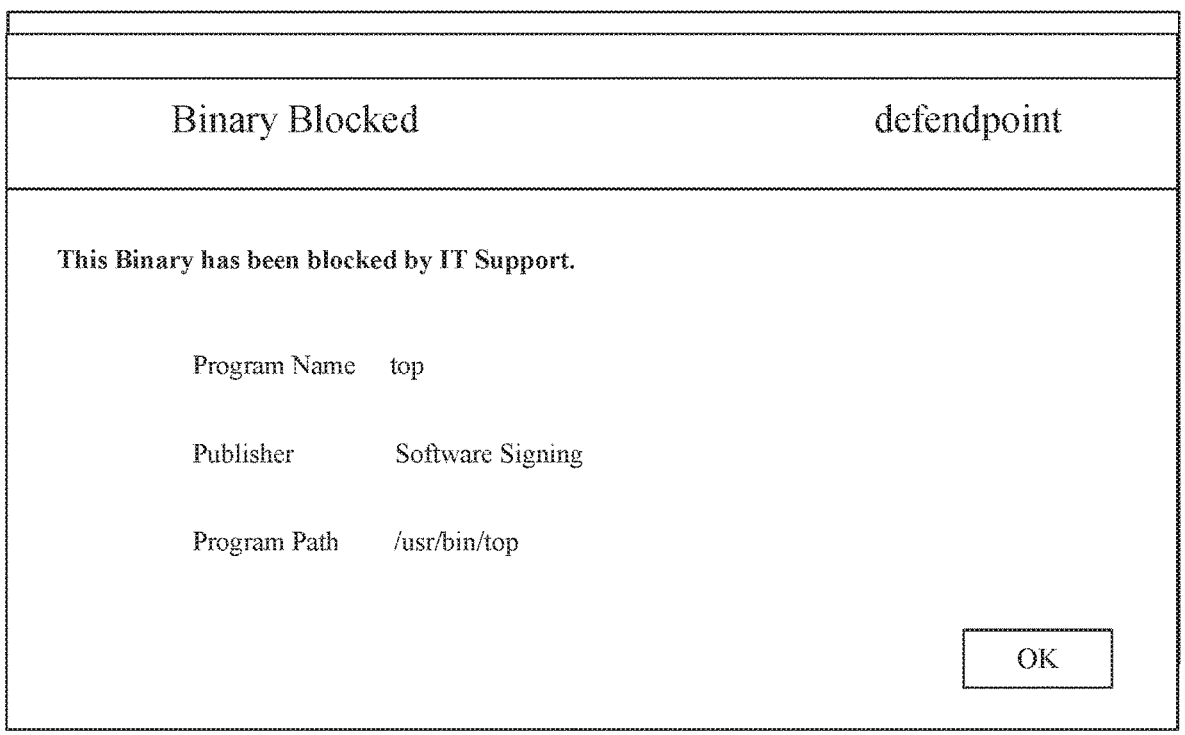

FIG. 5 is a flowchart illustrating an exemplary security service process 500 according to one aspect of the present disclosure.

In various embodiments, the process 500 begins at step 502, where the security service receives the copy of the event notification from the system extension. In some embodiments, the security service may be executed as a daemon during the initialization of the operating system. The security service may open a socket or IPC for communication with the system extension. In some embodiments, the IPC may correspond to Apple's XPC framework. The security service may receive one or more event notifications from the system extension and apply a policy engine against the event notification.

At step 504, the security service proceeds to evaluate the copy of the event notification against a series of policies defining rules. The security service may determine one or more rules applicable to the event. In some embodiments, the security service may determine the information necessary to apply the rules to the event. The security service and/or system extension may collect, generate, or determine a variety of information related to the event and computing device for application of the rules. As an example, the security service or system extension may generate a hash of the particular application (or meta application) corresponding to the event, verify a digital signature of the application, determine properties of the particular application (e.g., size, version, last modified, etc.), query a secure data store of the operating system to determine a source as to where the particular application originated from, or gather other information about the particular file.

The security service may determine information about the computing device, such as, a geolocation of the device, a current user, a device name, a hardware identifier of the computing device, a current time, other software applications installed on the client device, and whether a security hardware device is coupled to the computing device, among other aspects. The security service may determine information about the history of interactions with the computing device, such as determining how many times the particular application has been executed before and whether each attempt was successful. For example, the security service may apply an enhanced check on the particular application, according to the policies, when the particular application (or a current version of the particular application) has never been executed by the computer device.

The security service may evaluate the collected information against the policy rules to determine whether the event is authorized to be performed. In some embodiments, the collected information (or a subset of information) may be transmitted to an external security system for the application of the policies. In another embodiment, the security service may verify that the policies are up-to-date before applying the policies to the collected information. If the policies are not up-to-date, the security service may download one or more new or updated policies from the security system prior to applying the policies. In some embodiments, the policies are updated in real-time as they are modified on the security system or according to a schedule rather than during an event evaluation.

The security service may determine that one or more challenges or assertions are required based on the policies. As an example, the security service can generate a dialog box that requests additional information from a current user. The additional information received may be stored along with a log of the event. In some embodiments, the additional information may be further processed. For example, the user may be asked a question with an answer that is easy to determine by humans but not by computers to verify that a human is performing the execution. As another example, the question may be specific to the user, such as requesting user credentials, user birthdate, or user identifying information. The security service may require that the user perform an action, such as verify a pin number texted to or emailed to an address associated with a current user account. The security service may send a request to an application installed on another client device (e.g., a smartphone associated with a current user account) to confirm that the action is being performed by the current user. The policy may specify one or more multi-factor authentication requirements for particular applications.

The security service may log reasons as to why an event was authorized or denied. In some embodiments, the security service may provide the log information to the security system for further processing. As such, administrative users may be able to view collective statistics describing which applications are being denied as well as reasons for those denials. The security system can generate recommendations of policy changes based on the log results. If approved, the security system can update the policies and send the updated policies to various computing devices for future use.

In one embodiment, at step 506, the security service returns an indication relating to whether the event associated with the event notification is authorized/safe to proceed. The result may be a Boolean value that indicates whether to approve or deny the event. In other embodiments, the result may include a request for a reason that the event occurred, which may be provided by a user of the computing device. In some embodiments, the result may include a message that can show a reason for blocking or allowing. In various embodiments, the result can include a requirement for the operating system (via the endpoint security component) to issue a request for a message, an authentication, or a challenge-response. The result can include a combination of multiple options, such as require a user to provide a reason message and a challenge-response, allow with a challenge-response and an authentication, or deny with a user providing a reason message.

In some embodiments, the system extension can be informed of the final result of the action. As an example, another component may deny the action when the system extension allowed the action. The system extension can be alerted to the final result for audit purposes. In one embodiment, the system extension may be in passive mode for one or more types, categories, or specific events. For passive mode, the system extension may not change the result of whether the action is allowed to proceed but merely logs the result of the action. The system extension may process a first event notification with the event-based system process 300 and process a second event notification in passive mode based on metadata associated with the second event notification. In some embodiments, the system extension can apply one or more rules to determine whether to apply passive mode to an event notification.

With reference to FIGS. 6A-6F, shown are user interface elements according to various embodiments of the present disclosure. According to one embodiment, the user interface element 603 can be rendered on a display of the computing device when the system extension returns allow for an event with a message. The message can require confirmation to proceed. The message may explain that the event is logged. In some embodiments, the message can include details about the user that initiated the event (not shown). A user may select "Yes" to proceed with performing the event (e.g., installing a program) or select "No" to cancel. In this example, the user may select "No" and cancel the event even though the system extension authorized the event as safe.

The user interface element 606 can be rendered on the display when the system extension returns allow for an event with a reason. The user can provide a reason in the text box and select OK to continue or cancel to cancel the event. The user interface element 609 can be rendered on the display when the system extension returns allow with authentication. The user can authenticate credentials and select OK to continue with the event or select cancel to cancel the event. The credentials can be validated against a credential system (e.g., credential system 218). The user interface element 612 can be rendered on the display when the system extension returns allow with challenge-response. The user can call an administrator and provide the code "1187 1609" to the IT administrator. In the box immediately to the right (at the cursor in the center), the user can enter a code provided by the IT administrator in response. If the proper code is entered and the user selects Authorize, the event will proceed. Otherwise, the user can select cancel to cancel the event.

The user interface element 615 can be rendered on the display when the system extension returns block or deny. The user is informed that the application is not authorized for the event. The user interface element 618 can be rendered on the display when the system extension returns block or deny with a message. The user can provide a reason that the event is being requested for the application (e.g., executing the application). A list of submitted reasons across all computing devices can be compiled and rendered on a user interface for an administrator. The administrator can utilize this information to adjust one or more policies to allow for future installation of the application. For example, if twenty users requested to install "Calculator. app" with valid reasons for use, the administrator may add "Calculator.app" as an authorized application in the policy files such that future attempts to install the Calculator are successful. The system may facilitate approval of the "Calculator.app" by providing a sandbox for the administrator to test installing the application and by hashing the application and storing the signature to ensure future installations are safe.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media that can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions include, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

What is claimed is:

1. A method comprising:
    subscribing, via a system extension executed by at least one computing device, for at least one event type with an operating system;
    receiving, via the system extension, an event notification comprising metadata associated with an event, the event corresponding to one of the at least one event type;

monitoring, via the system extension, for a change to an application corresponding to the event;

performing, via the system extension, a comparison of the metadata against one or more predefined lists;

determining, via the system extension, an action based on at least one of: the comparison of the metadata or whether a change to the application has occurred; and instructing, via the system extension, the operating system to perform the action.

2. The method of claim 1, wherein the one or more predefined lists comprises a whitelist and a blacklist.

3. The method of claim 1, wherein the comparison comprises determining that the whitelist includes the metadata and the action comprises allowing the event to execute.

4. The method of claim 1, wherein the comparison comprises determining that the blacklist includes the metadata and the action comprises denying the event to execute.

5. The method of claim 1, further comprising:
transmitting, via the system extension, the event notification to a queue; and prior to instructing the operating system to perform the action, removing, via the system extension, the event notification from the queue.

6. The method of claim 1, wherein the action comprises:
denying the event to execute in response to detecting a change to the application corresponding to the event: or allowing the event to execute based on the comparison of the metadata in response to not detecting a change to the application corresponding to the event.

7. The method of claim 1, further comprising:
generating, via the system extension, a copy of the event notification; and transmitting, via the system extension, the copy of the event notification to a security service.

8. The method of claim 7, further comprising:
applying, via the system extension, the copy of the event notification to a policy to determine the action; and receiving, via the system extension, the action from the security service.

9. A system comprising:
at least one computing device;
a security service executable by the at least one computing device; and
a system extension in communication with the security service and executable by the at least one computing device, the system extension being configured to:
subscribe with an operating system for at least one event type;
receive an event notification comprising metadata associated with an event from the operating system, the event corresponding to one of the at least one event type;
monitor for a change to an application corresponding to the event;
perform a comparison of the metadata against one or more predefined lists;
determine an action based on at least one of: the comparison of the metadata or whether a change to the application has occurred; and
instruct the operating system to perform the action.

10. The system of claim 9, further comprising a queue, wherein the one or more predefined lists comprises a whitelist and a blacklist.

11. The system of claim 10, wherein the system extension is further configured to:
push the event notification to the queue, wherein the comparison comprises determining that the event is not included on the whitelist or the blacklist.

12. The system of claim 9, wherein the security service is configured to apply a policy comprising a plurality of rules to the event notification.

13. The system of claim 9, wherein the comparison comprises determining that the blacklist includes the metadata.

14. The system of claim 13, wherein the system extension is further configured to:
store a copy of the event notification;
transmit the event notification to a security service; and
receive the action from the security service, wherein the action comprises an indication of whether the event is authorized.

15. The system of claim 14, wherein the system extension is further configured to:
instruct the operating system to generate a command to kill a process corresponding to the event.

16. A non-transitory computer-readable medium embodying a program that, when executed by at least one computing device, causes the at least one computing device to:
subscribe with an operating system for at least one event type;
receive an event notification comprising metadata associated with an event, the event corresponding to one of the at least one event type;
monitor for a change to an application corresponding to the event;
perform a comparison of the metadata against one or more predefined lists;
determine an action based on at least one of: the comparison of the metadata and whether a change to the application has occurred; and
instruct the operating system to perform the action.

17. The non-transitory computer-readable medium of claim 16, wherein the program further causes the at least one computing device to:
determine that a predefined time threshold from receipt of the event notification has been exceeded; and
instruct the operating system to deny the event based on the predefined time threshold being exceeded.

18. The non-transitory computer-readable medium of claim 17, wherein the predefined time threshold is equal to an operating system timeout corresponding to the event notification minus a predefined offset.

19. The non-transitory computer-readable medium of claim 18, wherein the predefined offset is between 5%-10% of the operating system timeout.

20. The non-transitory computer-readable medium of claim 16, wherein the at least one event type comprises an open event and an execution event.

* * * * *